(12) United States Patent  (10) Patent No.: US 7,194,470 B2
Miyawaki et al.  (45) Date of Patent: Mar. 20, 2007

(54) DATA DELIVERY MANAGEMENT SYSTEM

(75) Inventors: Hiroshi Miyawaki, Saijo (JP); Kazunori Takahashi, Saijo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 504 days.

(21) Appl. No.: 10/464,445

(22) Filed: Jun. 19, 2003

(65) Prior Publication Data

US 2003/0236798 A1 Dec. 25, 2003

(30) Foreign Application Priority Data

Jun. 19, 2002 (JP) ............................. 2002-177826

(51) Int. Cl.
*G00F 17/30* (2006.01)
(52) U.S. Cl. ....................... 707/10; 709/203
(58) Field of Classification Search ................. 707/10, 707/104.1, 1, 100, 200; 709/203, 710; 703/25
See application file for complete search history.

(56) References Cited

U.S. PATENT DOCUMENTS 5,892,909 A * 4/1999 Grasso et al. ............... 709/201

2002/0023069 A1* 2/2002 Blank et al. ................. 707/1
2003/0023465 A1* 1/2003 Smith et al. ................. 705/7

FOREIGN PATENT DOCUMENTS

| JP | 04-152439 | 5/1992 |
|---|---|---|
| JP | 08-190506 | 7/1996 |
| JP | 2001-222616 | 8/2001 |
| JP | 2001-265859 | 9/2001 |
| JP | 2001-273417 | 10/2001 |
| JP | 2001352041 A | 11/2001 |
| JP | 2001-338063 | 12/2001 |
| JP | 2002-092366 | 3/2002 |
| JP | 2002-092517 | 8/2002 |

* cited by examiner

*Primary Examiner*—Greta Robinson
*Assistant Examiner*—Cheryl Lewis
(74) *Attorney, Agent, or Firm*—Steptoe & Johnson LLP

(57) ABSTRACT

A data delivery management system is provided that allows an unused capability of an end-user terminal to effectively be used. A data delivery server system (110) stores and manages an apportionment management table (116) listing the apportionment Levels of the capability apportioned by the end-user terminal (101) in an apportionment management database (114). The data delivery server system (110) specifies an apportionment level to use, bills an appropriate charge according to an apportionment level charge table (117), and uses the capability apportioned by the end-user terminal (101).

45 Claims, 6 Drawing Sheets

DATA DELIVERY MANAGEMENT SYSTEM

FIELD OF THE INVENTION

The present invention relates to a data delivery management system in which a data delivery server system delivers data provided from a content supply system to end-user terminals over a public network and unused capabilities of the end-user terminals can be made available to the data delivery server system or the content supply system.

BACKGROUND OF THE INVENTION

It is expected that end-user terminals, such as Internet-enabled refrigerators and television sets, that can be connected to a public network such as the Internet will rapidly become commonplace. Their performance has become increasingly higher because of the technological innovations in hardware and software. For example, video recorders and players containing a hard disk are becoming widespread as end-user terminals used in a data delivery management system delivering video data over the Internet. The storage capacity of the hard disk is on the order of several hundred gigabytes, which can record several hundred hours of video.

However, the improvement in the performance often produces unused capabilities for some end-users. For example, for an end user who needs only several hours of video recording time, the remaining several hundred hours of recording capability of a hard disk in a video recorder/player is an excessive capability which he or she does not use but yet should manage. Therefore, there has been a need for effective use of such unused capabilities.

DISCLOSURE OF THE INVENTION

To solve the problem, the object of the present invention is to provide a data delivery management system in which a data delivery server system delivers data from a content supply system to an end-user terminal over a public network, the data delivery server system manages information about capabilities apportioned by the end-user terminal and information about capabilities requested by the content supply system, and makes the capabilities available to the data delivery server system and the content supply system, thereby enabling effective use of unused capabilities of the user-terminal.

According to claim 1 of the present invention, there is provided a data delivery management system in which a data delivery server system delivers data to at least one end-user terminal over a public network, wherein the at least one end-user terminal comprises a terminal system management device for generating apportionment management information concerning a storage capability of a storage device, the storage capability being apportioned by the at least one end-user terminal, the data delivery server system comprises an apportionment management database for storing and managing the apportionment management information, and when the data delivery server system sends information to the at least one end-user terminal for indicating that the data delivery server system wants to use an apportioned storage capability according to the apportionment management information stored and managed in the apportionment management database, the at least one end-user terminal makes the apportioned storage capability available.

According to claim 2 of the present invention, there is provided a data delivery management system in which a data delivery server system delivers data to at least one end-user terminal over a public network, wherein the at least one end-user terminal comprises a terminal system management device for generating apportionment management information concerning a processing capability of a processor, the processing capability being apportioned by the at least one end-user terminal, the data delivery server system comprises an apportionment management database for storing and managing the apportionment management information, and when the data delivery server system sends information to the at least one end-user terminal for indicating that the data delivery server system wants to use an apportioned processing capability according to the apportionment management information stored and managed in the apportionment management database, the at least one end-user terminal makes the apportioned processing capability available.

According to claim 3 of the present invention, there is provided a data delivery management system in which a data delivery server system delivers data to at least one end-user terminal over a public network, wherein the at least one end-user terminal comprises a terminal system management device for generating apportionment management information concerning a display capability of a display device or display devices, the display capability being apportioned by the at least one end-user terminal, the data delivery server system comprises an apportionment management database for storing and managing the apportionment management information, and when the data delivery server system sends information to the at least one end-user terminal for indicating that the data delivery server system wants to use an apportioned display capability according to the apportionment management information stored and managed in the apportionment management database, the at least one end-user terminal makes the apportioned display capability available.

According to claim 4 of the present invention, there is provided a data delivery management system in which a data delivery server system delivers data to at least one end-user terminal over a public network, wherein the at least one end-user terminal comprises a terminal system management device for generating apportionment management information concerning an output capability of an output device or output devices, the output capability being apportioned by the at least one end-user terminal, the data delivery server system comprises an apportionment management database for storing and managing the apportionment management information, and when the data delivery server system sends information to the at least one end-user terminal for indicating that the data delivery server system wants to use an apportioned output capability according to the apportionment management information stored and managed in the apportionment management database, the at least one end-user terminal makes the apportioned output capability available.

According to claim 5 of the present invention, there is provided a data delivery management system in which a data delivery server system delivers data to at least one end-user terminal over a public network, wherein the at least one end-user terminal comprises a terminal system management device for generating apportionment management information concerning an input capability of an input device or input devices, the input capability being apportioned by the at least one end-user terminal, the data delivery server system comprises an apportionment management database for storing and managing the apportionment management information, and when the data delivery server system sends information to the at least one end-user terminal for indicating that the data delivery server system wants to use an apportioned input capability according to the apportionment management information concerning the input capability that is stored and managed in the apportionment management database, the at least one end-user terminal makes the apportioned input capability available.

According to claim 6 of the present invention, there is provided a data delivery management system in which a data delivery server system delivers data to at least one end-user terminal over a public network, wherein the at least one end-user terminal comprises a terminal system management device for generating apportionment management information concerning a communication capability of a communication device or communication devices, the communication capability being apportioned by the at least one end-user terminal, the data delivery server system comprises an apportionment management database for storing and managing the apportionment management information, and when the data delivery server system sends information to the at least one end-user terminal for indicating that the data delivery server system wants to use an apportioned communication capability according to the apportionment management information stored and managed in the apportionment management database, the at least one end-user terminal makes the apportioned communication capability available.

The data delivery management system set forth in claim 7 of the present invention is the data delivery management system according to claim 1, wherein the apportionment management information includes the apportioned amount or apportionment level of the storage capability, the apportionment level specifying grade-wise the apportioned amount of the storage capability, and the apportioned amount of the storage capability includes at least one of storage capacity, transfer speed, use time zone, and use term of the storage device.

The data delivery management system set forth in claim 8 of the present invention is the data delivery management system according to claim 2, wherein the apportionment management information includes the apportioned amount or apportionment level of the processing capability, the apportionment level specifying grade-wise the apportioned amount of the processing capability, and the apportioned amount of the processing capability includes at least one of processing speed, occupancy rate, use time zone, and user term of the processor.

The data delivery management system set forth in claim 9 of the present invention is the data delivery management system according to claim 3, wherein the apportionment management information includes the apportioned amount or apportionment level of the display capability, the apportionment level specifying grade-wise the apportioned amount of the display capability, and the apportioned amount of the display capability includes at least one of display content, display quality, display brightness, display time zone, and display term of the display device.

The data delivery management system set fort in claim 10 of the present invention is the data delivery management system according to claim 4, wherein the apportionment management information includes the apportioned amount or apportionment level of the output capability, the apportionment level specifying grade-wise the apportioned amount of the output capability, and the apportioned amount of the output capability includes at least one of output speed, output content, output quality, output brightness, output time zone, and output term of the output device.

The data delivery management system set forth in claim 11 of the present invention is the data delivery management system according to claim 5, wherein the apportionment management information includes the apportioned amount or apportionment level of the input capability, the apportionment level specifying grade-wise the apportioned amount of the input capability, and the apportioned amount of the input capability includes at least one of input content, input quality, input speed, input time zone, and input term of the input device.

The data delivery management system set forth in claim 12 of the present invention is the data delivery management system according to claim 6, wherein the apportionment management information includes the apportioned amount or apportionment level of the communication capability, the apportionment level specifying grade-wise the apportioned amount of the communication capability, and the apportioned amount of the communication capability includes at least one of transfer rate, communication capability, communication time zone, and communication term of the communication device.

The data delivery management system set forth in claim 13 of the present invention is the data delivery management system according to any of claims 1 to 12, wherein a plurality of end-user terminals are connected to the data delivery server system over the public network and the data delivery server system selects one or more of the plurality of end-user terminals on the basis of the apportionment management information to send the information indicating that the data delivery server system wants to use the apportioned capability.

The data delivery management system set forth in claim 14 of the present invention is the data delivery management system according to any of claims 1 to 12, wherein a plurality of end-user terminals are connected to the data delivery server system over the public network, at least one of the end-user terminals comprises the terminal system management device, and the data delivery server system selects one or more of the end-user terminals on the basis of the apportionment management information to send the information indicating that the data delivery server system wants to use the apportioned capability.

The data delivery management system set forth in claim 15 of the present invention is the data delivery management system according to any of claims 1 to 12, wherein the data delivery server system sends information indicating that the data delivery server system wants to use an apportioned amount or apportionment level of the apportioned capability.

The data delivery management system set forth in claim 16 of the present invention is the data delivery management system according to claim 13, wherein the data delivery server system sends information indicating that the data delivery server system wants to use an apportioned amount or apportionment level of the apportioned capability.

The data delivery management system set forth in claim 17 of the present invention is the data delivery management system according to claim 14, wherein the data delivery server system sends information indicating that the data delivery server system wants to use an apportioned amount or apportionment level of the apportioned capability.

The data delivery management system set forth in claim 18 of the present invention is the data delivery management system according to claim 17, wherein the apportionment amount or apportionment level of the apportioned capability can be set by an end user on the end-user terminal.

The data delivery management system set forth in claim 19 of the present invention is the data delivery management system according to claim 17, wherein the terminal system management device records usage of the end-user terminal and automatically sets an appropriate apportioned amount or apportionment level of the apportioned capability according to the recorded usage.

The data delivery management system set forth in claim 20 of the present invention is the data delivery management system according to claim 18, wherein, when any of the end-user terminal is connected to the data delivery server system over the public network, the apportionment management information is automatically sent to the data delivery server system.

The data delivery management system set forth in claim 21 of the present invention is the data delivery management system according to claim 19, wherein, when the end-user terminal is connected to the data delivery server system over the public network, the apportionment management information is automatically sent to the data delivery server system.

The data delivery management system set forth in claim 22 of the present invention is the data delivery management system according to claim 20, wherein information about the usage charge for the apportioned capability is added to information about the apportioned amount or apportionment level of the apportioned capability to produce apportionment management information and an end user is allowed to set the usage charge on the end-user terminal, and when the data delivery server system sends information to the end-user terminal for indicating that the data delivery server system pays the usage charge according to the apportionment management information, the end-user terminal makes the apportioned capability available to the data delivery server system.

The data delivery management system set forth in claim 23 of the present invention is the data delivery management system according to claim 21, wherein information about the usage charge for the apportioned capability is added to information about the apportioned amount or apportionment level of the apportioned capability to produce apportionment management information and an end user is allowed to set the usage charge on the end-user terminal, and when the data delivery server system sends information to the end user terminal for indicating that the data delivery server system pays the usage charge according to the apportionment management information, the end-user terminal makes the apportioned capability available to the data delivery server system.

The data delivery management system set forth in claim 24 of the present invention is the data delivery management system according to claim 20, wherein data delivery server system sends apportionment management information concerning the apportioned capability to a content supply system connected to the data delivery server system over the public network and, when the data delivery server system receives a request from the content supply server for using the apportioned capability, the data delivery server system allows the content supply system to use the apportioned capability of the end-user terminal or terminals.

The data delivery management system set forth in claim 25 of the present invention is the data delivery management system according to claim 21, wherein the data delivery server system sends the apportionment management information concerning the apportioned capability to a content supply system connected to the data delivery server system over the public network and, when the data delivery server system receives a request from the content supply server for using the apportioned capability, the data delivery server system allows the content supply system to use the apportioned capability of the end-user terminal or terminals.

The data delivery management system set forth in claim 26 of the present invention is the data delivery management system according to claim 22, wherein the data delivery server system sends the apportionment management information concerning the apportioned capability and the usage charge to a content supply system connected to the data delivery server system over the public network, and when the data delivery server system receives information indicating that the content supply system pays the usage charge, bills the content supply system for the usage charge and allows the content supply system to use the capability apportioned by the end-user terminal or terminals.

The data delivery management system set forth in claim 27 of the present invention is the data delivery management system according to claim 23, wherein the data delivery server system sends the apportionment management information concerning the apportioned capability and the usage charge to a content supply system connected to the data delivery server system over the public network, and when the data delivery server system receives information indicating that the content supply system pays the usage charge, bills the content supply system for the usage charge and allows the content supply system to use the capability apportioned by the end-user terminal or terminals.

The data delivery management system set forth in claim 28 of the present invention is the data delivery management system according to claim 24 or 26, wherein the data delivery server system comprises a request management data base for storing and managing request management information concerning a capability or capabilities requested by the content supply system connected to the data delivery server system over the public network, the data delivery server system sends the request management information to the end-user terminal or terminals, and when the data delivery server system receives information indicating permission to use the apportioned capability, the data delivery server system allows the content supply system to use the capability apportioned by the end-user terminal or terminals.

The data delivery management system set forth in claim 29 of the present invention is the data delivery management system according to claim 25 or 27, wherein the data delivery server system comprises a request management data base for storing and managing request management information concerning a capability or capabilities requested by the content supply system connected to the data delivery server system over the public network, and the data delivery server system sends the request management information to the end-user terminal or terminals, and when the data delivery server system receives information indicating permission to use the apportioned capability, the data delivery server system allows the content supply system to use the capability apportioned by the end-user terminal or terminals.

The data deliver management system set forth in claim 30 of the present invention is the data delivery management system according to claim 24 or 26, wherein the data delivery server system comprises a request management database for storing and managing request management information concerning a capability or capabilities requested and the charge desired by the content supply system connected to the data delivery server system over the public network, the data delivery server system sends the request management information to the end-user terminal or terminals, and when the data delivery server system receives information indicating permission to use the apportioned capability, the data delivery server system bills the content supply system for the charge and allows the content supply system to use the capability apportioned by the end-user terminal or terminals.

The data delivery management system set forth in claim 31 of the present invention is the data delivery management system according to claim 25 or 27, wherein the data delivery server system comprises a request management database for storing and managing request management information concerning a capability or capabilities requested and the charge desired by the content supply system connected to the data delivery server system over the public network, the data delivery server system sends the request management information to the end-user terminal or terminals, and when the data delivery server system receives information indicating permission to use the apportioned capability, the data delivery server system bills the content supply system for the charge and allows the content supply system to use the capability apportioned by the end-user terminal or terminals.

The data delivery management system set forth in claim 32 of the present invention is the data delivery management system according to claim 20, wherein the data delivery server system comprises a request management database for storing and managing request management information concerning a capability or capabilities requested by the content supply system connected to the data delivery server system over the public network, and the data delivery server system compares the request management information concerning the capability with the apportionment management information concerning the apportioned capability to automatically select one or more end-user terminals from among the plurality of end-user terminals connected to the data delivery server system over the public network so that the request from the content supply system is met, and allows the content supply system to use the capability apportioned by the one or more of the end-user terminals.

The data delivery management system set forth in claim 33 of the present invention is the data delivery management system according to claim 21, wherein the data delivery server system comprises a request management database for storing and managing request management information concerning a capability or capabilities requested by the content supply system connected to the data delivery server system over the public network, the data delivery server system compares the request management information concerning the capability with the apportionment management information concerning the apportioned capability to automatically select one or more end-user terminals from among the plurality of end-user terminals connected to the data delivery server system over the public network so that the request from the content supply system is met, and allows the content supply system to use the capability apportioned by the one or more of the end-user terminals.

The data deliver management system set forth in claim 34 of the present invention is the data delivery management system according to claim 22, wherein the data delivery server system comprises a request management database for storing and managing request management information concerning a capability or capabilities requested and the charge desired by the content supply system connected to the data delivery server system over the public network, and the data delivery server system compares the request management information concerning the apportioned capability and the usage charge with the apportionment management information concerning the capability and the charge to automatically select one or more end-user terminals from among the plurality of end-user terminals connected to the data delivery server system over the public network so that the capability requested and the charge desired by the content supply system are met, bills the content supply system for the charge, and allows the content supply system to use the capability apportioned by the one or more of the end-user terminals.

The data delivery management system set forth in claim 35 of the present invention is the data delivery management system according to claim 23, wherein the data delivery server system comprises a request management database for storing and managing request management information concerning a capability or capabilities requested and the charge desired by the content supply system connected to the data delivery server system over the public network, and the data delivery server system compares the request management information concerning the apportioned capability and the usage charge with the apportionment management information concerning the capability and the charge to automatically select one or more end-user terminals from among the plurality of end-user terminals connected to the data delivery server system over the public network so that the capability requested and the charge desired by the content supply system are met, bills the content supply system for the charge, and allows the content supply system to use the capability apportioned by the one or more of the end-user terminals.

The data delivery management system set forth in claim 36 of the present invention is the data delivery management system according to claim 20, wherein the data delivery server system comprises a request management database for storing and managing request management information concerning a capability or capabilities requested by each of a plurality of content supply systems connected to the data delivery server system over the public network, and the data delivery sever system compares the apportionment management information concerning the apportioned capabilities of the plurality of end-user terminals connected to the data delivery server system over the public network with the request management information concerning the capabilities requested by the plurality of content supply systems to automatically select a pair of an end-user terminal or terminals and a content supply system that have conditions matching with each other, and allows the content supply system to use the capability apportioned by the end-user terminal or terminals.

The data delivery management system set forth in claim 37 of the present invention is the data delivery management system according to claim 21, wherein the data delivery server system comprises a request management database for storing and managing request management information concerning a capability or capabilities requested by each of a plurality of content supply systems connected to the data delivery server system over the public network, and the data delivery sever system compares the apportionment management information concerning the apportioned capabilities of the plurality of end-user terminals connected to the data delivery server system over the public network with the request management information concerning the capabilities requested by the plurality of content supply systems to automatically select a pair of an end-user terminal or terminals and a content supply system respectively having conditions matching with each other, and allows the content supply system to use the capability apportioned by the end-user terminal or terminals.

The data delivery management system set forth in claim 38 of the present invention is the data delivery management system according to claim 22, wherein the data delivery server system comprises a request management database for storing and managing request management information concerning a capability or capabilities requested and the charge desired by each of a plurality of content supply system connected to the data delivery server system over the public network, and the data delivery server system compares the apportionment management information concerning the apportioned capabilities and the usage charges of the plurality of end-user terminals connected to the data delivery server system over the public network with the request management information concerning the capabilities requested and the charges desired by the plurality of content supply systems to automatically select a pair of an end-user terminal or terminals and a content supply system that have conditions matching with each other, bills the content supply system for the charge, and allows the content supply system to use the capability apportioned by the end-user terminal or terminals.

The data delivery management system set forth in claim 39 of the present invention is the data delivery management system according to claim 23, wherein the data delivery server system comprises a request management database for storing and managing request management information concerning a capability or capabilities requested and the charge desired by each of a plurality of content supply system connected to the data delivery server system over the public network, and the data delivery server system compares the apportionment management information concerning the apportioned capabilities and the usage charges of the plurality of end-user terminals connected to the data delivery server system over the public network with the request management information concerning the capabilities requested and the charges desired by the plurality of content supply systems to automatically select a pair of an end-user terminal or terminals and a content supply system respectively having conditions matching with each other, bills the content supply system for the charge, and allows the content supply system to use the capability apportioned by the end-user terminal or terminals.

The data delivery management system set forth in claim 40 of the present invention is the data delivery management system according to any of claims 28, 32, and 36, wherein the request management information concerning the capabilities includes the required amount or the required level or the capability requested by the content supply system, the required level specifying grade-wise the required amount.

The data delivery management system set forth in claim 41 of the present invention is the data delivery management system according to any of claims 29, 33, and 37, wherein the request management information concerning the capability includes the required amount or the required level of the capability requested by the content supply system, the required level specifying grade-wise the required amount.

The data delivery management system set forth in claim 42 of the present invention is the data delivery management system according to any of claims 30, 34, and 38, wherein the request management information concerning the capability and the charge includes the required amount or the required level of the capability requested by the content supply system specifying grade-wise the required amount and includes the charge desired by the content supply system, the charge being in accordance with the required amount or the required level.

The data delivery management system set forth in claim 43 of the present invention is the data delivery management system according to any of claims 31, 35, and 39, wherein the request management information concerning the capability and the charge includes the required amount or a required level of the capability requested by the content supply system specifying grade-wise the required amount and includes the charge desired by the content supply system, the charge being in accordance with the required amount or required level.

The data delivery management system set forth in claim 44 of the present invention is the data delivery management system according to claim 34 or 38, wherein the selection is automatically made so that the selection is most advantageous to the end-user terminal in terms of charge.

The data delivery management system set forth in claim 45 of the present invention is the data delivery management system according to claim 35 or 39, wherein the selection is automatically made so that the selection is most advantageous to the end-user terminal in terms of charge.

The data delivery management system set forth in claim 46 of the present invention is the data delivery management system according to claim 34 or 38, wherein the selection is automatically made so that the selection is most advantageous to the content supply system in terms of charge.

The data delivery management system set forth in claim 47 of the present invention is the data delivery management system according to claim 35 or 39, wherein the selection is automatically made so that the selection is most advantageous to the content supply system in terms of charge.

According to the present invention, the data delivery server system manages information about capabilities apportioned by end-user terminal(s) and information about capabilities requested by content supply system(s) and makes the capabilities apportioned by the end-user terminal(s) available to the data delivery server system or content supply system(s), thereby enabling effective use of unused capabilities of the end-user terminal(s).

DESCRIPTION OF THE DRAWINGS

Embodiments of the present invention will be described below with reference to the accompanying drawings. The embodiments provided herein are only illustrative. The present invention is not limited to the embodiments described below.

(First Embodiment)

A data delivery management system according to a first embodiment will be described with respect to FIGS. 1 and 2.

Figure 1:
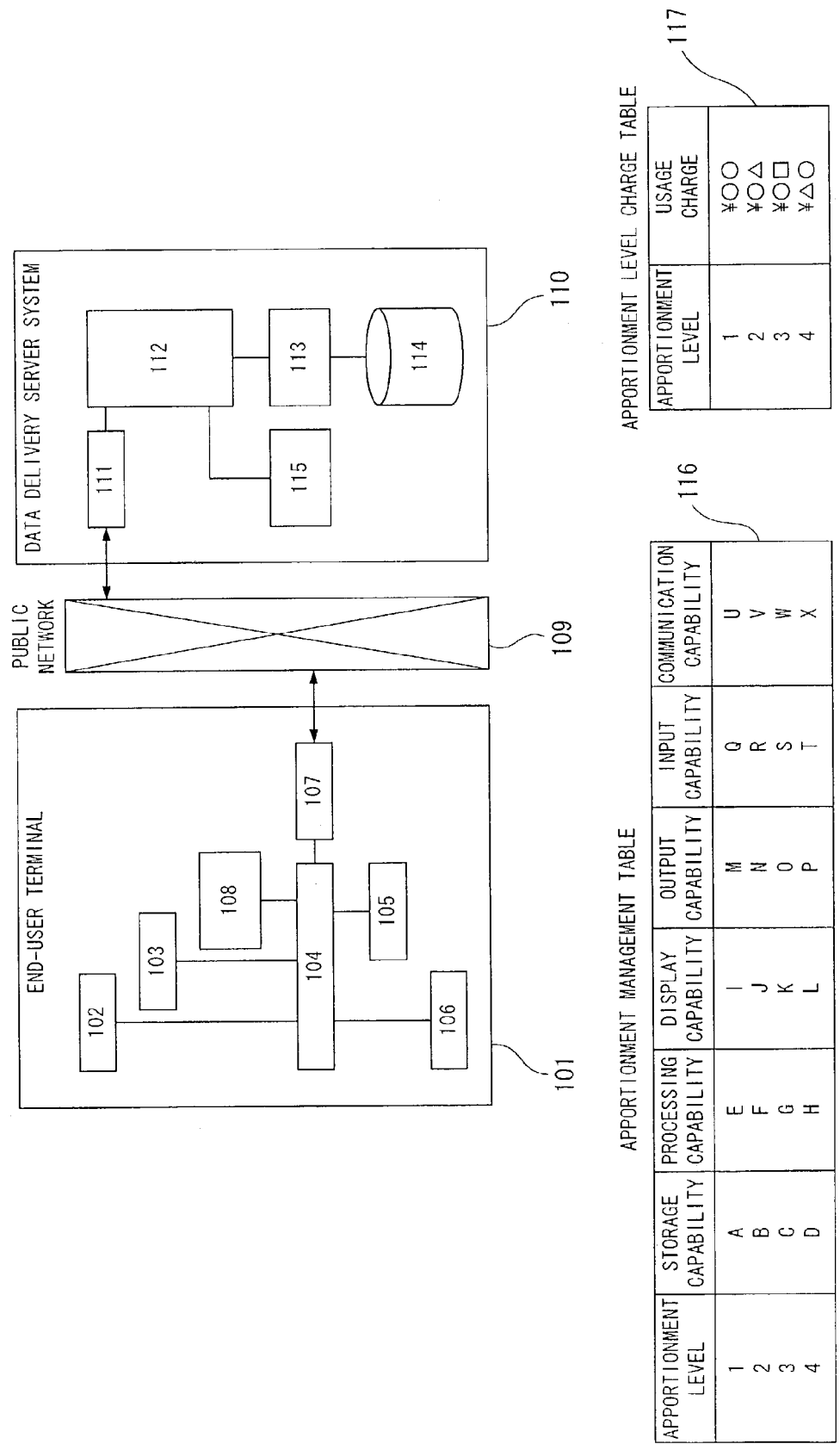
FIG. 1 is a block diagram schematically showing a data delivery management system A according to a first embodiment of the present invention.
Figure 2:
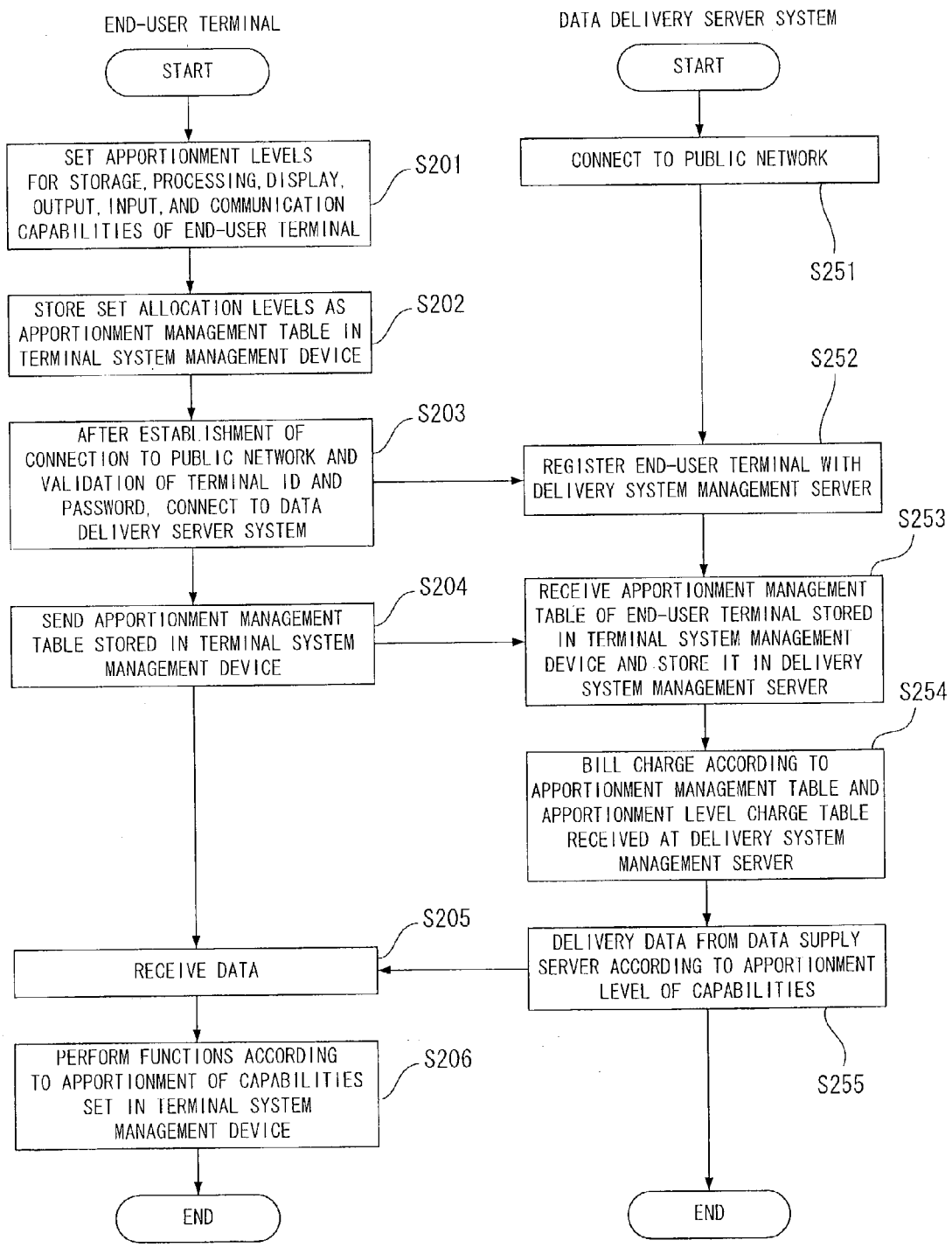
FIG. 2 is a flowchart explaining an operation of the data delivery management system A with respect to an end-user terminal and a data delivery server system according to the first embodiment of the present invention.

FIG. 1 shows an example of a data delivery management system A according to the first embodiment. The configuration of the data delivery management system A is not limited to this. Furthermore, the end-user terminal may be any device, including, but not limited to, a personal computer, video recorder/player containing a hard disk, and a video game machine containing a CPU, for example.

The data delivery management system A in the first embodiment has the main characteristic that the end-user terminal apportions any of its capabilities to the data delivery server system connected to it over a public network and the data delivery server system is charged for the use. Alternatively, the end-user terminal may apportion a capability for free.

For example, the end-user terminal may make the display capability of its display device partly available to the data delivery server system. For example, the end-user terminal may allow the data delivery server system to use the display capability within a certain time slot. If the end-user terminal allows its display device to be used by the data delivery server system for six hours a day, then the data delivery server system can display any images on the display device for six hours in a given time zone by paying for the use. Apportionment of the display capability is not limited to time-based apportionment. A screen image, the quality and brightness of the display, or a display term may be apportioned.

Furthermore, the storage capabilities of the storage device of the end-user terminal may be apportioned to the data delivery server system. For example, storage capacity and transfer rate may be apportioned to the data delivery server system. If the capacity of a storage device is 50 GB and the transfer rate is 50 Mbps, and 10 GB of storage is apportioned to the data delivery server system at a transfer rate of 20 Mbps, then the data delivery server system can store 10 GB of data in that storage device and access the storage device at 20 Mbps by paying for the use. The storage capabilities that can be apportioned are not limited to the storage capacity or transfer rate. A time zone or term in which the storage device is made available to the data delivery server system may also be apportioned.

The end-user terminal 101 shown in FIG. 1 includes a display device 102, an input device 103, a processor 104, an output device 105, a storage device 106, and a communication device 107. Capabilities of any of these devices can be apportioned. The end-user terminal 101 further includes a terminal system management device 108 for generating an apportionment management table 116 containing apportionment management information. In the first embodiment, the apportionment management table 116 lists apportionment levels. An apportionment level corresponds to an apportioned amount of the capabilities of a device. The apportioned amount may be a display time of six hours on the display device in the example described above, or may be 10 GB of memory of the storage device. While the apportionment levels are used in the first embodiment, amounts of capacities may be used instead of the apportionment levels. That is, any one of the apportionment levels can provide apportionment management information. The apportioned amounts or apportionment levels of a capability may be set by an end user. Alternatively, the terminal system management device may record and monitor the usage of each capability of the end-user terminal and automatically set optimum apportioned amounts or apportionment levels.

When the end-user terminal 101 is connected to the data delivery server system 110 through the communication device 107 and a public network 109, the end-user terminal 101 automatically sends its apportionment management table 116 from the terminal system management device 108 to the a delivery system management server 113 incorporated in the data delivery server system 110. Alternatively, the table 116 may be sent in response to an instruction from the user. In addition to the apportionment management table 116, an apportionment level charge table 117 is transferred in the first embodiment. The apportionment level charge table lists the usage charges for the apportionment levels. The settings in the apportionment level charge table may be provided by the end-user. Alternatively, the terminal system management device may record and monitor the usage of each capability of the end-user terminal and automatically set the most appropriate charge for the apportioned amount or apportionment level. The apportionment level charge table and the apportionment management table may be integrated into a single table.

The delivery system management server 113 stores the transferred apportionment management table and apportionment level charge table 117 in an apportionment management database 114.

The data delivery server system 110 includes a communication device 11, a data delivery server 112 for delivering data, the delivery system management server 113 for controlling the apportionment management database 114 and the delivery server 112 according to information in the apportionment management table, the apportionment management database 114 for storing and managing the apportionment management table 116 and apportionment level charge table, and a data supply server 115 for storing data to be delivered to end-user terminals.

A specific operation of the data delivery management system A configured as described above will be described below with reference to FIG. 2. FIG. 2 is a flowchart of a process performed in the data delivery management system A according to the first embodiment.

The end-user terminal 101 first sets apportionment of its storage, processing, display, output, and communication capacities and then sets their apportionment levels at step 201. For example, the end-user terminal 101 sets an apportioned amount A for the storage capability and E for the processing capability and sets their apportionment level to 1. The end-user terminal 101 also sets a apportioned amount B for the storage capability and F for the processing capability and sets their apportionment level to 2. It also sets a usage charge for each apportionment level.

The end-user terminal 101 stores the set apportionment levels in the form of apportionment management table 116 and the usage charges in the form of apportionment level charge table 117 in the terminal system management device 108 at step S202.

The end-user terminal 101 is connected to the public network 109 and after its terminal ID and password are validated, it is connected to the data delivery server system 110 at step S203. The end-user terminal 101 then sends the apportionment management table 116 and apportionment level charge table 117 stored in the terminal system management device 108 to the delivery system-management server 113 in the data delivery server system 110 at step S204.

Then the end-user terminal 101 receives data provided by the data supply server 115 in the data delivery server system 110 at step S205. The end-user terminal 101 also receives a program to be executed for the data it received.

The data is delivered according to the apportionment level set in the terminal system management device 108. The end-user terminal 101 performs its functions at step S206.

The data delivery server system 110 is connected to the public network at step S251 and registers the end-user terminal 101 with the delivery system management server 113 at step S252.

At step 253, the data delivery server system 110 receives the apportionment management table 116 and the apportionment level charge table 117 sent from the end-user terminal 101 and the delivery system management server 113 stores and maintains them in the apportionment management database 114.

The data delivery server system 110 selects an apportionment level from the apportionment management table 116 and the apportionment level charge table 117 at step S254. The data delivery sever system 110 then sends information indicating that it will use that apportionment level (and information about usage charge payment) to the end-user terminal 101 and refers to the apportionment level charge table 117 and pays the relevant charge.

The data delivery server system 110 delivers data according to the apportionment management table 116 to the end-user terminal 101 from the data supply server 115 at step S255.

While the apportionment level charge table is generated in the end-user terminal in this example, it may be generated in the data delivery server system. In that case, the usage charge is decided at the data delivery server system on the basis of the apportionment management table transferred from the end-user terminal and indicates the usage charge to the end-user terminal and asks the end-user terminal whether or not it accepts the decision.

An example of settings of capability apportioned amount and apportionment level settings will be described below. The following assumptions are made. The capacity of the storage device of an end-user terminal is 100 GB, the processing speed of the processor is 200 GOPS (Giga Operation per Second), the output speed of the printer is 100 sheets/hour, and the transmission speed of the communication device is 100 Mbps. The apportionment of the storage device is set to a storage capacity of 50 GB, the apportionment of the communication capability is set to communication speed of 50 Mbps, the apportionment of the display capability of the display device is set to 10 hours, and the apportionment of the input capability of the input device is set to 5 hours. The apportionment levels of these capacities are set to 1 and the usage charges are set accordingly. The apportionment level can be changed at any time.

Other storage capabilities of the storage device, such as transfer rate, time zone and usage term in addition to storage capacity, may also be apportioned.

Other processing capabilities of the processor, such as a processing share rate, time zone, and usage term may also be apportioned.

Other display capabilities of the display device that can be apportioned include a display image, display quality, brightness, and a display term.

Apportionment of a display image herein means that a part of four-part split screen is made available for displaying an image provided from the data delivery server system, for example. The display quality includes the resolution of a superimposed image, for example. The display brightness includes display colors.

The output capabilities of an output device (such as a printer) includes, output data, output quality, brightness, output time zone, and output term, besides the output speed, which can be apportioned.

Apportionment of output data may be, for example, that a part of a four-part split sheet is made available for displaying printing data provided from a data delivery server system if the output device is a printer. The output quality may be the resolution of a superimposed image and the output brightness may be a color.

The input capabilities of an input device (such as a video camera and a microphone) may be input data, input quality, input speed, and an input term, besides an input time zone, which can be apportioned.

Apportionment of the input data may be, for example, that a part of a four-part split image is sent from a video camera, which is an input device, to the data delivery server system. The input quality may be the resolution and the number of colors of the image and the input speed is the image transfer rate of the video camera.

The communication capabilities of a communication device may be a communication capability, time zone, and term, which can be apportioned.

As can be seen from the forgoing description, the data delivery management system according to the first embodiment allows a remote data delivery server system to buy and centrally manage an apportioned capability of an end-user terminal connected to the data delivery server system over a network. Thus, unused capabilities of the end-user terminal can be made available for uses other than their intended uses on a chargeable basis. Accordingly, the resources of the end-user terminal can effectively used and therefore the data delivery management system is highly advantageous. The user of the end-user terminal can save management costs for the terminal because he or she can sell the unused capacities.

While the first embodiment has been described with respect to the example in which the data delivery server system is connected to one end-user terminal, the embodiment of course is also applicable to a case where a plurality of end-user terminals are connected. In that case, the data delivery server system can select any one of the end user terminals on the basis of apportionment management information. The selection may be automated so that the end-user terminal can receive the highest charge. Alternatively, the selection may be automated so that the end-user terminal is most advantageous to the data delivery server system in terms of charge.

While first embodiment has been described with respect to the example in which only the end-user terminal that can made available part of its capability is connected to the data delivery server system, the data delivery server system can of course be connected to an end-user terminal incapable of apportioning capabilities to the data delivery server system.

(Second Embodiment)

A data delivery management system B according to a second embodiment of the present invention will be described below with reference to FIGS. 3 and 4.

Figure 3:
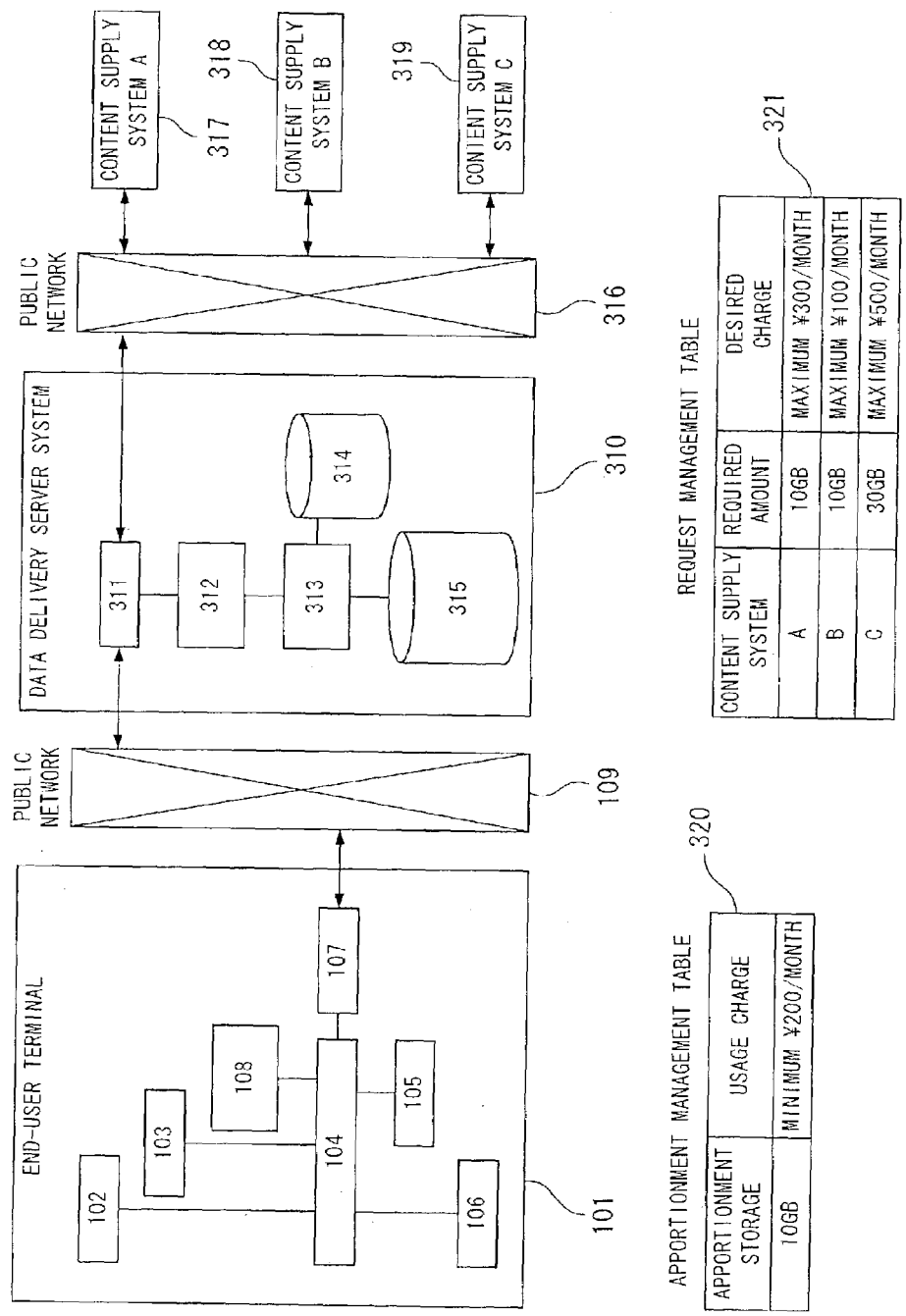
FIG. 3 is a block diagram schematically showing a data delivery management system B according to a second embodiment of the present invention.
Figure 4:
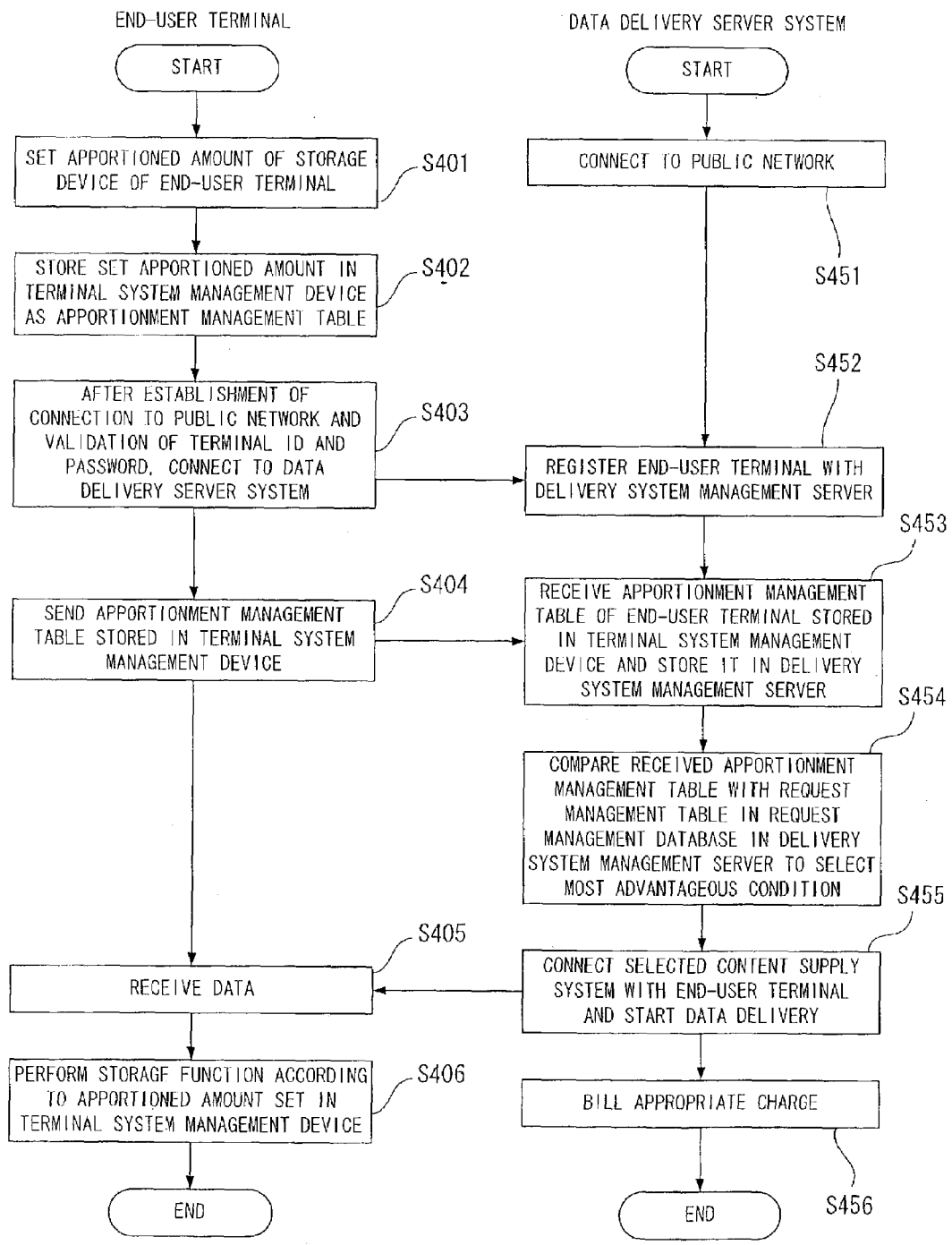
FIG. 4 is a flowchart explaining an operation of the data delivery management system B with respect to an end-user terminal and a data delivery server system according to the second embodiment of the present invention.

FIG. 3 shows an example of the data delivery management system B according to the second embodiment. The configuration of the data delivery management system B is not limited to the one shown in FIG. 3. While an example will be described in which an end-user terminal makes available a part of its storage capability, capabilities that can be made available is not limited to this. The same components as those of the data delivery management system A shown in FIG. 1 are labeled with the same reference numbers, the description of which will be omitted.

The data delivery management system B in the second embodiment is characterized by that a data delivery serve system allows content supply systems connected to the data delivery server system over a public network to use a storage capability that is made available by an end-user terminal and bills the content supply system. This service may also be provided at no charge.

In the data delivery management system B according to the second embodiment, the end-user terminal indicates the amount of storage capacity made available to a content supply system and the charge for the usage as apportionment management information and content supply systems indicate a required capacity of storage and the desired charge for it as request management information. The data delivery server system receives the information and automatically selects a content supply system that meets the conditions. The data delivery server system then enables the selected content supply system to use the storage capacity made available by the end-user terminal.

If the end-user terminal indicates the allocation level and the usage charge as apportionment management information, the content supply systems indicate their required levels and desired usage charges. The required levels represent required amounts grade-wise and the desired usage charges are set according to the levels.

While the second embodiment will be described with respect to an example in which one end-user terminal is connected to the data delivery server system, a plurality of end-user terminal may be connected to it.

Furthermore, while three content supply systems are connected to the data delivery system in this example, the number of content supply systems is not limited to three.

While only the end-user terminal that can make available part of its capacities is connected to the data delivery server system in the example, the data delivery server system may of course be connected with end-user terminals that cannot make available any of their capacities as well.

Also, the data delivery server system can automatically select the content supply system that is most advantageous to the end-user terminal in terms of charge. If a plurality of end-user terminals are connected to the data delivery server system, the data delivery server system may automatically select the end-user terminal that is most advantageous to the content supply system in terms of charge.

An end-user terminal 101 in FIG. 3 comprises a display device 102, an input device 103, a processor 104, an output device 105, a storage device 106, and communication device 107, each of which is capable of making available a part of its capability. It is assumed in this example that part of the storage capability is made available. The end-user terminal 101 holds an apportionment management table 320 listing an apportioned amount and its usage charge in a terminal system management device 108. While the apportionment management table in the second embodiment lists the apportioned amount, it may list an apportionment level instead.

When the end-user terminal 101 is connected to a data delivery server system 310 through the communication device 107 over a public network 109, the end-user terminal 101 automatically transfers the apportionment management table 320 in the terminal system management device 108 to a delivery system management server 313 included in the data delivery server system 310.

The delivery system management sever 313 stores and manages the apportionment management table 320 transferred to it in an apportionment management database 314.

This data delivery server system 310 differs from the data delivery server system shown in FIG. 1 in that the data delivery server system 310 stores and manages capabilities requested and the charges desired by content supply system (request management information) and compares the request management information with the apportionment management information to select a content supply system that meets conditions provided by the end-user terminal and allow that content supply system to use the capability made available by the end-user terminal, and then bills the content supply system for the charge.

The data delivery server system 310 comprises a communication device 311, a delivery server 312 for delivering data, a delivery system management server 313, and the apportionment management database 314 for storing and managing the apportionment management table 320. The data delivery server system 310 also includes a request management database 315 for storing and managing one or more request management tables (request management information) 321 listing capabilities (required amounts of capabilities) requested by content supply systems A 317, B 318, and C 319 desired usage charge. The delivery system management server 313 controls the apportionment management table 320 and the request management database 315 and also controls the delivery server 312 according to information in these databases.

The delivery system management server may generate one request management table 321 for each of the content supply systems A 317, B 318, and C 319 on the basis of data on requested capabilities and desired charges sent from each of the content supply system A 317, B 318, and C 319. Alternatively, the delivery system management server may generate a request management table by integrating request management tables listing requested capabilities and desired charges received from the content supply systems.

The delivery system management server 313 automatically selects the content supply system that meets conditions provided by the end-user terminal on the basis of the information contained in the apportionment management table 320 and the request management table(s) 321, connects that content supply system with the end-user terminal, enables the content supply system to use the part of storage capacity made available by the end-user terminal 101, and bills the content supply system for the charge.

A specific operation of the data delivery management system B configured as described above will be described below with reference to FIG. 4. FIG. 4 is a flowchart of a process performed in the data delivery management system B according to the second embodiment.

The end-user terminal 101 sets apportioned part of its storage capabilities that it makes available and their usage charges at step S401. For example, it sets the apportionment to 10 GB and its usage charge to a minimum of 200 yen per month as shown in FIG. 3.

The end-user terminal 101 stores the apportionment and the usage charge as an apportionment management table 320 in the terminal system management device 108 at step S402.

The end-user terminal 101 is connected to the public network 109, and if its ID and password are verified, connected to the data delivery server system 310 at step S403. It then sends the apportionment management table 320 stored in the terminal system management device 108 to the delivery system management server 313 in the data delivery server system 310 at step S404.

The end-user terminal 101 then receives data from a content supply system specified by the delivery system management server 313 at step S405. It also receives a program to be executed for that data it received.

The data is delivered according to the apportionment set in the terminal system management device 108. The end-user terminal 101 stores the data in the storage device 106 at step S406.

The data delivery server system 310 is connected to the public network at step S451 and registers the end-user terminal 101 with the delivery system management server 313 at step S452.

At step 453, the data delivery server system 310 receives the apportionment management table 320 sent from the end-user terminal 101 and the delivery system management server 313 stores and manages it in the apportionment management database 314.

At step S454, the delivery system management server 313 compares the apportionment management table 320 stored in the apportionment management database 314 with the request management table(s) 321 stored in the request management database 315 to select the most appropriate content supply system that meets the conditions.

At step S455, the data delivery server system 310 connects the content supply system selected at step S454 with the end-user terminal 101 and starts delivering data.

The data delivery server system 310 may indicate to the selected content supply system that it has been selected. If the data delivery server system 310 receives a request from the content supply system for using the capability apportioned by the end-user terminal, then the data delivery server system 310 may send that indication to the end-user terminal and connect the content supply system with the end-user terminal with the permission from the end-user terminal.

At step S456, the data delivery server system 310 bills the content supply system selected at step S454 for an appropriate charge and pays the charge paid from the content supply system to the end-user terminal. The charge is set by the delivery system management server on the basis of the information contained in the apportionment management table and request management table in favor of the end-user terminal.

The apportioned part of the storage of the end-user terminal 101 and the usage charge are set to 10 GB and a minimum of 200 yen per month, respectively, in the second embodiment. The required amounts of capabilities and desired charges set in the request management table are 10 GB for 300 yen per month at maximum for the content supply system A, 10 GB for 100 yen per month at maximum for the content supply system B, and 30 GB for 500 yen per month at maximum for the content supply system C. The delivery system management server 313 in the data delivery server system 310 therefore selects the content supply system A and connects it with the end-user terminal 101. Information about the content supply system A (the name of the content delivery system, for example) may be indicated to the end-user terminal 101. The delivery system management server 313 selects the content supply system A because the delivery management server system 313 is programmed to make selection and charging in favor of the end-user terminal in this example. It bills the content supply system A for 300 yen per month so that 300 yen per month is paid to the end-user terminal 101. If the delivery system management server 313 were programmed in favor of the content supply system in terms of charge, it would bill the content supply system for 200 yen because the charge desired by the content supply system is 300 at maximum and the charge requested by the end-user terminal is 200 yen at minimum. There may be various methods for selecting a content supply system. For example, if there are a plurality of content supply systems that meet the conditions provided by the end-user terminal, the delivery system management server may select the content supply system that has set the highest charge or may select the content supply system that set the lowest charges.

While the delivery system management server selects a content supply system that meet the conditions in this example, the request management table(s) stored in the request management database may be disclosed to the end-user terminal to allow the end-user terminal to select a content supply system.

As described above, the data delivery management system according to the second embodiment allows a part of the capabilities that is apportioned by the end-user terminal to be made available to the content supply system on a chargeable basis. As a result, the resources can effectively be used and therefore the data delivery management system is highly advantageous. Moreover, the end-user terminal can sell its unused capacities, thereby reducing the management costs.

While a part of storage capacity is apportioned in the second embodiment, other capabilities may be apportioned and the number of the apportioned capabilities is not limited to one.

While the content supply system that provides the most advantageous condition to the end-user terminal is selected in the example, the selection may be made in favor of the content supply system.

While the data delivery server system compares the conditions provided by the end-user terminal and the conditions provided by the content supply systems and automatically selects the content supply system that meets the conditions to connect it to the end-user terminal and allows the content supply system to use the capability made available by the end-user terminal in the second embodiment, the data delivery server system may send the apportionment management table to the content supply systems to allow one of the content supply systems to select an end-user terminal.

Alternatively, the request management table may be sent to the end-user terminal to allow it to select a content supply system.

In that case, the system can be made impartial because information stored and managed in the data delivery server system can be disclosed and either of the end-user terminal and the content supply systems can make a selection.

(Third Embodiment)

A data delivery management system C according to a third embodiment will be described with reference to FIGS. 5 and 6.

Figure 5:
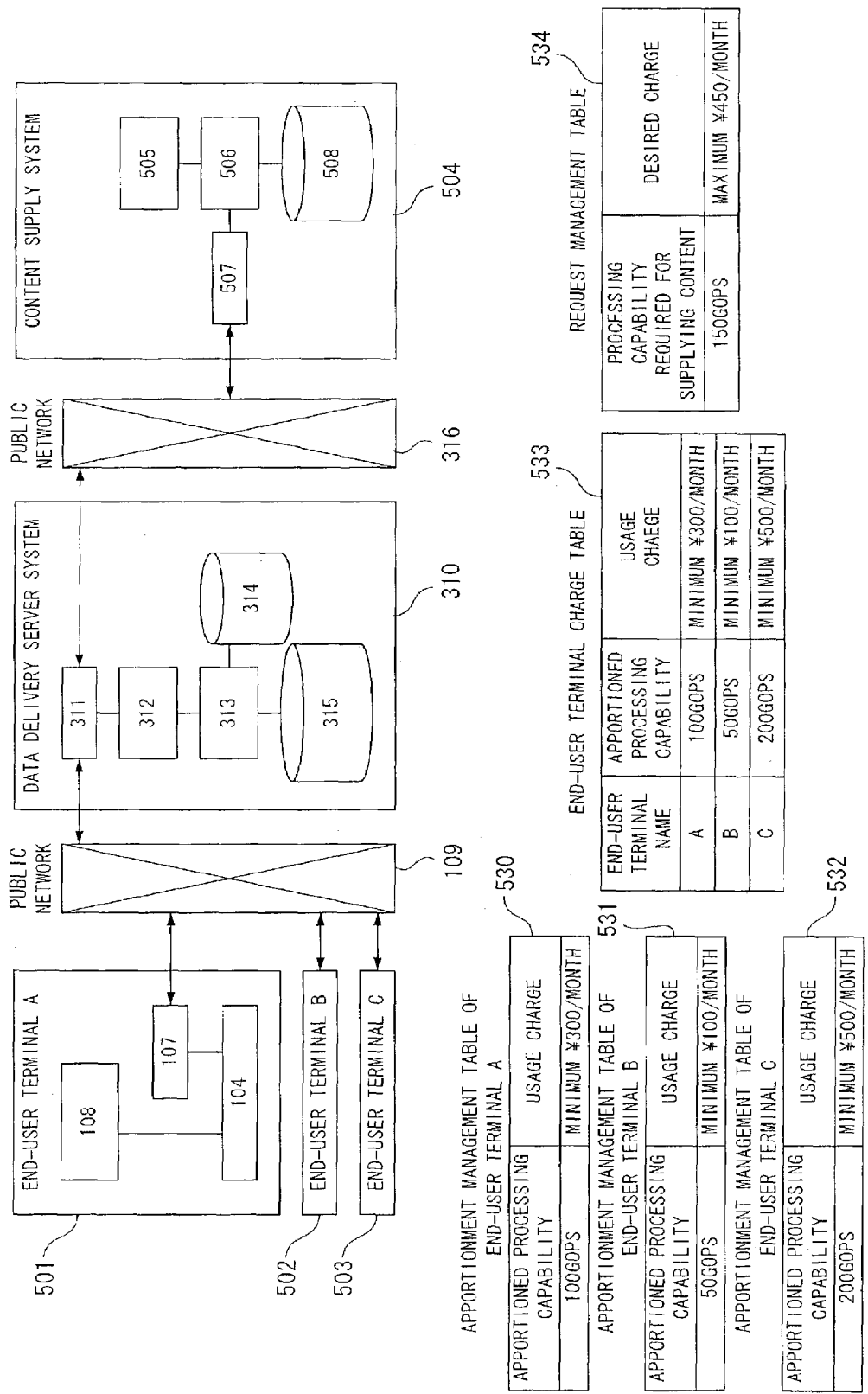
FIG. 5 is a block diagram schematically showing a data delivery management system C according to a third embodiment of the present invention.
Figure 6:
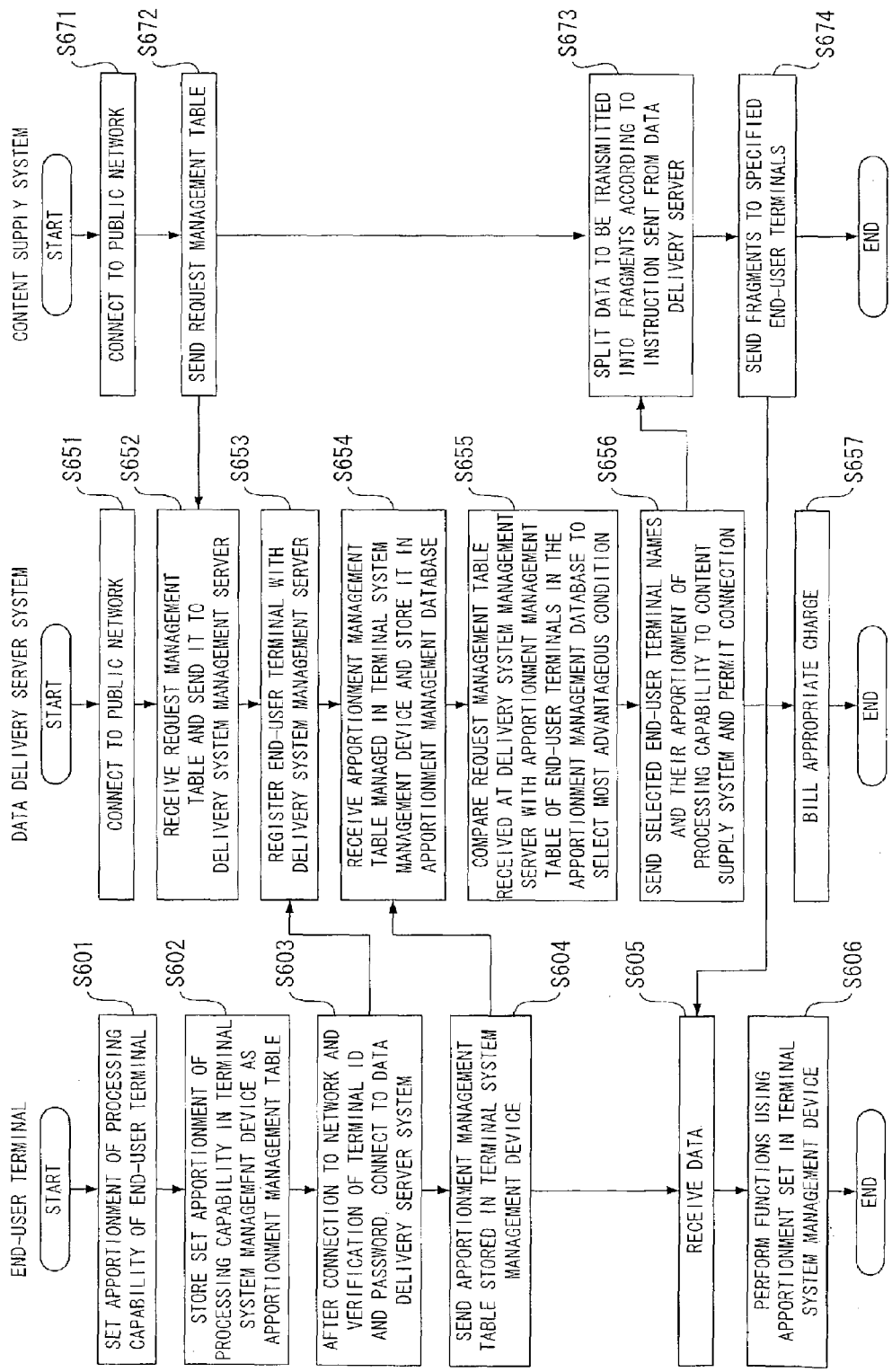
FIG. 6 is a flowchart explaining an operation of the data delivery management system C with respect to an end-user terminal, a data delivery server system, and a content supply system according to the third embodiment of the present invention.

FIG. 5 shows an exemplary configuration of the data delivery management system C according to the third embodiment. The configuration of the data delivery management system C is not limited to this. The third embodiment will be describe with respect to an example in which an end-user terminal makes part of its processing capability available, the third embodiment is not limited to this. The same components as those in the data delivery management systems A and B shown in FIGS. 1 and 3 are labeled with the same reference numbers, the description of which will be omitted.

The data delivery management system C according to the third embodiment is characterized by that information about amounts of processing capabilities made available by a plurality of end-user terminals and their charges (apportionment management information) is compared with information about a required amount of processing capability requested by a content supply system and its desired charge (request management information) and a set of a plurality of end-user terminals is automatically selected so that conditions provided by both parties are met.

In the data delivery management system C according to the third embodiment, each of the end-user terminals indicates amounts of their capabilities that are to be made available and the their charges and the content supply system indicates required amounts of processing capabilities and its desired usage charges as the request management information. The data delivery server system receives the information and automatically selects a set of end-user terminals that meet the conditions provided by them. It then connects the content supply system to each of the selected end-user terminals, allows the content supply system to use the apportionment of the processing capabilities made provided by each of the end-user terminal and bills the content supply system for the charge. It may be made available on a free-of-charge basis.

While the third embodiment will be described with the example in which three end-user terminals are connected to the data delivery server system, the number of end-user systems is, of course, not limited to three.

While one content supply system is connected to the data delivery server system in this example, more than one content supply system may be, of course, connected to the data delivery server system.

While the example will be described in which only the end-user terminals capable of making available apportionments of their capabilities are connected to the data delivery server system, the data delivery server system may of course be connected with end-user terminals that cannot make available any parts of their capabilities.

The data delivery server system may automatically select end-user terminals that are most advantageous to the content supply system in terms of charge or it may automatically select end-user terminals in favor of the end-user terminals in terms of charge.

An end-user terminal A 501 in FIG. 5 comprises a processor 104 and a communication device 107. Part of the capability of the processor 104 can be apportioned to the content supply system. The end-user terminal A 501 stores an apportionment management table A 503 listing the amount of the part of the processing capability and the charge in its terminal system management device 108. Likewise, an end-user terminal B 502 stores an apportionment management table B 531 listing the amount of a part of processing capability that can be made available and the charge. An end-user terminal C 503 stores an apportionment management table C 532 listing the amount of a part of the processing capability that can be made available and the charge.

When the end-user terminals 501, 502, and 503 are connected to the data delivery server system 310 through their communication devices over a public network 109, it automatically transfers their apportionment management tables in their terminal system management devices to a delivery system management server 313 included in the data delivery server system.

The delivery system management server 313 integrates the apportionment management tables transferred to it into an apportionment management table and stores and manages it in an apportionment management database 314. Alternatively, the delivery system management server 313 may receive data on the apportioned amount of capacities and their charges from the end-user terminals and generates an apportionment management table.

The present data delivery server system differs from the data delivery server system shown in FIG. 3 in that a delivery system management server included in the present data delivery server system automatically selects a set of end-user terminals so that conditions provided by the content supply system and the end-user terminals are met.

The content supply system 504 comprises a communication device 507 for communicating with the data delivery server system 310 over a public network 316, a content management server 505 for managing contents, a content supply server 506 for supplying contents, and a content database 508 holding a request management table 534 listing the amount of processing capability required for providing a content and the desired charge. Alternatively, the request management table 534 may be omitted but information on the amount of processing capability required for providing contents and the desired charge may be provided. In that case, the delivery system management server 313 generates a request management table on the basis of information about the capability requested by the content supply system 504 and its desired charge.

A specific operation of the data delivery management system C configured as described above will be described with reference to FIG. 6. FIG. 6 is a flowchart of a process performed in the data delivery management system C according to the third embodiment.

The end-user terminals 501, 502, and 503 first set the apportionments of processing capability and their charges at step S601. For example, the end-user terminal A 501 sets the apportionment to 100 GOPS and its charge to ¥300/month at minimum, the end-user terminal B 502 sets the apportionment to 50 GOPS and its charges to ¥100/month at minimum, and the end-user terminal C 503 sets the apportionment to 200 GOPS and its charge to ¥500/month at minimum.

Each end-user terminal stores the set apportionments and charge in its terminal system management device as an apportionment management table 530, 531, 532 at step S602.

Each end-user terminal is connected to the public network 109, and if its terminal ID and password are verified, connected to the data delivery server system 310 at step S603. It then sends the apportionment management table 530, 531, 532 stored in its terminal system management device to the delivery system management server 313 in the data delivery server system 310 at step S604.

Each end-user terminal then receives data from the content supply system at step S605. The end-user terminal also receives a program to be executed for the data it received.

The data is delivered according to the apportionment set in the terminal system management device of each end-user terminal system. The end-user terminal performs processing at step S606.

The data delivery server system 310 is connected to the public network at step S651. The data delivery server system 310 receives the request management table 534 listing the amount of processing capability required for supplying contents and the desired charge from the content supply system 504 and sends it to the delivery system management server 313 at step S652. The data delivery server system 310 registers the end-user terminals 501, 502, and 503 with the delivery system management server 313 at step S653.

At step S654, the data delivery server system 310 receives the apportionment management tables 530, 531, and 532 sent from the end-user terminals 501, 502, and 503. Then the delivery system management server 313 in the data delivery server system 310 integrates the apportionment management tables 530, 531, and 532 into one apportionment management table 533 and stores and manages it in the apportionment management database 314.

At step 655, the data delivery server system 310 compares the apportionment management table stored in the apportionment management database 314 with the request management table 534 obtained at step 652 to select the most appropriate end-user terminals that meet the conditions. In the third embodiment, the selection of the user-terminals and charges are performed in favor of the content supply system 504 in terms of charge.

At step S656, the data delivery server system 310 sends the names of the selected end-user terminals and their apportionment of processing capacity to the content supply system 504 and connects the terminals to the content supply system 504. When receiving the request from the content supply system for using the apportioned capacities, the data delivery server system 310 may send information about the request to the end-user terminals and obtain permission from the end-user terminals.

The data delivery server system 310 then bills the charge at step S657.

The content supply system 504 is connected to the public network at step S671 and sends the request management table listing the amount of processing capability required for supplying contents and the desired charge to the data delivery server system 310 at step S672.

The content supply system 504 splits send data into fragments according to an instruction sent from the data delivery server system 310 at step S673 and sends the fragments to the specified end-user terminals at step S674.

In the third embodiment, the apportioned processing capability of the end-user terminal A 501 and the charge are set to 100 GOPS and minimum ¥200/month, respectively. The apportioned processing capability of the end-user terminal B 502 and the charge are set to 50 GOPS and minimum ¥100/month, respectively. The apportioned processing capability of the end-user terminal C 503 and the charge are set to 200 GOPS and minimum ¥500/month, respectively. The processing capability required for supplying contents and the desired charge listed in the request management table 534 are 150 GOPS and maximum ¥450/month, respectively. The delivery system management server 313 in the data delivery server system 310 selects the end-user terminals A 501 and B 502 and connects them with the content supply system 504 so that the content supply system 504 can deliver data to them. At the same time, the delivery system management server 313 bills the content supply system 504 ¥400 per month, pays ¥300 per month to the end user terminal A 501 and ¥100 per month to the end-user terminal B. There are many different ways of selecting end-user terminals. For example, the selection may be made in favor of the end-user terminals in terms of charge.

In this way, the data delivery management system B according to the third embodiment allows the content supply system to supply contents by using the processing capacities of the plurality of end-user terminals. The content supply system can use the unused capacities of the end-user terminals on a chargeable basis. Thus, the data delivery management system is highly advantageous because resources can effectively be used. The end-user terminals can save their managements costs because they can sell their unused capacities.

In addition to selecting a plurality of end-user terminals in such a manner that the capability required and the charge desired by a content supply system are met, one or more content supply systems may be selected so that apportioned amounts or levels of capacities apportioned by end-user terminals and the charges are met.

According to the data delivery management systems of the present invention described above, a data delivery server system connected with end-user terminals over a public network centrally manages information about the part of capacities of the end-user terminals made available by end users so that the data delivery server system and other users that can access the data delivery server system can use the part of capacities. Thus, the unused capacities of the end-user terminals can effectively be used. If the capacities are made available on a chargeable basis, the end-users can reduce costs for managing their terminals by selling unused capacities.

What is claimed is:

1. A data delivery management system, comprising:
   an end-user terminal; and
   a data delivery server, said data delivery server system delivers data to said end-user terminal over a network, and said end-user terminal comprises:
   a terminal system management device for generating apportionment management information concerning a storage capability of a storage device in said end-user terminal, the storage capability being apportioned and provided by said end-user terminal, and
   said data delivery server system comprises:
   an apportionment management database for storing and managing therein the apportionment management information concerning said end-user terminal,
   a delivery server for delivering data to said end-user terminal, and
   a delivery system management server for controlling storage of the apportionment management information in said apportionment management database, and controlling, based on the apportionment management information stored and managed in said apportionment management database the delivery of data to said end-user terminal by said delivery server, so that the data is delivered according to the storage capability apportioned and provided by said end-user terminal.

2. The data delivery management system according to claim 1, wherein said apportionment management information includes the apportioned amount or apportionment level of the storage capability, said apportionment level specifying grade-wise the apportioned amount of the storage capability, and the apportioned amount of the storage capability includes at least one of storage capacity, transfer speed, use time zone, and use term of the storage device.

3. The data delivery management system according to claim 2, wherein said data delivery server system sends to the end-user terminal information generated based on the apportionment management information stored and managed in the apportionment management database, the information indicating that said data delivery server system wants to use an apportioned amount or apportionment level of the storage capability apportioned and provided by the end-user terminal.

4. The data delivery management system according to claim 2, wherein the apportioned amount or apportionment level of the storage capability apportioned and provided by the end-user terminal can be set by an end user on the end-user terminal.

5. The data delivery management system according to claim 2, wherein said terminal system management device records usage of the end-user terminal and automatically sets an appropriate apportioned amount or apportionment level of the storage capability according to the recorded usage.

6. The data delivery management system according to claim 1, wherein a plurality of end-user terminals are connected to said data delivery server system over the network, and said data delivery server system selects at least one of the plurality of end user terminals, based on the apportionment management information stored and managed in the apportionment management database, to send to the selected end-user terminal information indicating that said data delivery server system wants to use the storage capability apportioned and provided by the end-user terminal.

7. The data delivery management system according to claim 1, wherein when the end-user terminal is connected to said data delivery server system over the network, the apportionment management information is automatically sent to said data delivery server system from the end-user terminal.

8. The data delivery management system according to claim 1, wherein information about usage charge for the storage capability apportioned and provided by the end-user terminal is added to information about the storage capability to produce apportionment management information, to allow an end-user to set the usage charge on the end-user terminal, and when said data delivery server system sends to the end-user terminal information indicating that said data delivery server system pays the usage charge according to the apportionment management information including the information about the usage charge stored and managed in the apportionment management database, the end-user terminal makes available toe the data delivery server system the storage capability apportioned and provided by the end-user terminal.

9. The data delivery management system according to claim 1, wherein said data delivery server system sends the apportionment management information stored and managed in the apportionment management database to a content supply system connected to said data delivery server system over the network, and, when said data delivery server system receives a request from the content supply server for usage the storage capability apportioned and provided by the end-user terminal, said data delivery server system allows the content supply system to use the storage capability apportioned and provided by the end-user terminal or terminals.

10. A data delivery management system, comprising:
an end-user terminal; and
a data delivery server, said data delivery server system delivers data to said end-user terminal over a network, and said end-user terminal comprises:
a terminal system management device for generating apportionment management information concerning a display capability of a display device in said end-user terminal, the display capability being apportioned and provided by said end-user terminal, and
said data delivery server system comprises:
an apportionment management database for storing and managing therein the apportionment management information concerning said end-user terminal,
a delivery server for delivering data to said end-user terminal; and
a delivery system management server for controlling storage of the apportionment management information in said apportionment management database, and controlling, based on the apportionment management information stored and managed in said apportionment management database the delivery of data to said end-user terminal by said delivery server, so that the data is delivered according to the display capability apportioned and provided by said end-user terminal.

11. The data delivery management system according to claim 10, wherein said apportionment management information includes the apportioned amount or apportionment level of the display capability, the apportionment level specifying grade-wise the apportioned amount of the display capability, and said apportioned amount of the display capability includes at least one of display content, display quality, display brightness, display time zone, and display term of the display device.

12. The data delivery management system according to claim 11, wherein said data delivery server system sends to the end-user terminal information generated based on the apportionment management information stored and managed in the apportionment management database, the information indicating that said data delivery server system wants to use an apportioned amount or apportionment level of the display capability apportioned and provided by the end-user terminal.

13. The data delivery management system according to claim 11, wherein the apportioned amount or apportionment level of the display capability apportioned and provided by the end-user terminal can be set by an end user on the end-user terminal.

14. The data delivery management system according to claim 11, wherein said terminal system management device records usage of the end-user terminal and automatically sets an appropriate apportioned amount or apportionment level of the display capability according to the recorded usage.

15. The data delivery management system according to claim 10, wherein a plurality of end-user terminals are connected to said data delivery server system over the network, and said data delivery server system selects at least one of the plurality of end-user terminals, based on the apportionment management information stored and managed in the apportionment management database, to send to the selected end-user terminal information indicating that said data delivery server system wants to use the display capability apportioned and provided by the end-user terminal.

16. The data delivery management system according to claim 10, wherein when the end-user terminal is connected to said data delivery server system over the network, the apportionment management information is automatically sent to said data delivery server system from the end-user terminal.

17. The data delivery management system according to claim 10, wherein information about usage charge for the display capability apportioned and provided by the end-user terminal is added to information about the display capability to produce apportionment management information, to allow an end user to set the usage charge on the end-user terminal, and when said data delivery server system sends to the end-user terminal information indicating that said data delivery server system pays the usage charge according to the apportionment management information including the information about the usage charge stored and managed in the apportionment management database, the end-user terminal makes available to the data delivery server system the display capability apportioned and provided by the end-user terminal.

18. The data delivery management system according to claim 10, wherein said data delivery server system sends the apportionment management information stored and managed in the apportionment management database to a content supply system connected to said data delivery server system over the network, and, when said data delivery server system receives a request from the content supply server for usage the display capability apportioned and provided by the end-user terminal, said data delivery server system allows the content supply system to use the display capability apportioned and provided by the end-user terminal or terminals.

19. A data delivery management system, comprising:
an end-user terminal; and
a data delivery server, said data delivery server system delivers data to said end-user terminal over a network, and said end-user terminal comprises:
a terminal system management device for generating apportionment management information concerning an output capability of an output device in said end-user terminal, the output capability being apportioned and provided by said end-user terminal, and
said data delivery server system comprises:
an apportionment management database for storing and managing therein the apportionment management information,
a delivery system management server for controlling storage of the apportionment management information in said apportionment management database, and controlling, based on the apportionment management information stored and managed in said apportionment management database the delivery of data to said end-user terminal by said delivery server, so that the data is delivered according to the display capability apportioned and provided by said end-user terminal.

20. The data delivery management system according to claim 19, wherein said apportionment management information includes the apportioned amount or apportionment level of the output capability, said apportionment level specifying grade-wise the apportioned amount of the output capability, and the apportioned amount of the output capability includes at least one of output speed, output content, output quality, output brightness, output time zone, and output term of the output device.

21. The data delivery management system according to claim 20, wherein said data delivery server system sends to the end-user terminal information generated based on the apportionment management information stored and managed in the apportionment management database, the information indicating that said data delivery server system wants to use an apportioned amount or apportionment level of the output capability apportioned and provided by the end-user terminal.

22. The data delivery management system according to claim 20, wherein the apportioned amount or apportionment level of the output capability apportioned and provided by the end-user terminal can be set by an end user on the end-user terminal.

23. The data delivery management system according to claim 20, wherein said terminal system management device records usage of the end-user terminal and automatically sets an appropriate apportioned amount or apportionment level of the output capability according to the recorded usage.

24. The data delivery management system according to claim 19, wherein a plurality of end-user terminals are connected to said data delivery server system over the network, and said data delivery server system selects at least one of the plurality of end-user terminals, based on the apportionment management information stored and managed in the apportionment management database, to send to the selected end-user terminal information indicating that said data delivery server system wants to user the output capability apportioned and provided by the end-user terminal.

25. The data delivery management system according to claim 19, wherein when the end-user terminal is connected to said data delivery server system over the network, the apportionment management information is automatically sent to said data delivery server system from the end-user terminal.

26. The data delivery management system according to claim 19, wherein information about usage charge for the output capability apportioned and provided by the end-user terminal is added to information about the output capability to produce apportionment management information, to allow an end user to set the usage charge on the end-user terminal, and when said data delivery server system sends to the end-user terminal information indicating that said data delivery server system pays the usage charge according to the apportionment management information including the information about he usage charge stored and managed in the apportionment management database, the end-user terminal makes available to the data delivery server system the output capability apportioned and provided by the end-user terminal.

27. The data delivery management system according to claim 19, wherein said data delivery server system sends the apportionment management information stored and managed in the apportionment management database to a content supply system connected to said data delivery server system over the network, and, when said data delivery server system receives a request from the content supply server for usage the output capability apportioned and provided by the end-user terminal, said data delivery server system allows the content system to use the output capability apportioned and provided by the end-user terminal or terminals.

28. A data delivery management system, comprising:
an end-user terminal; and
a data delivery server, said data delivery server system delivers data to said end-user terminal over a network, and said end-user terminal comprises:
a terminal system management device for generating apportionment management information concerning an input capability of an input device included in said end-user terminal, the input capability being apportioned and provided by said end-user terminal, and
said data delivery server system comprises:
an apportionment management database for storing and managing therein the apportionment management information concerning said end-user terminal,
a delivery system management server for controlling storage of the apportionment management information in said apportionment management database, and controlling, based on the apportionment management information stored and managed in said apportionment management database the delivery of data to said end-user terminal by said delivery server, so that the data is delivered according to the display capability apportioned and provided by said end-user terminal.

29. The data delivery management system according to claim 28, wherein said apportionment management information includes the apportioned amount or apportionment level of the input capability, said apportionment level specifying grade-wise the apportioned amount of the input capability, and the apportioned amount of the input capability includes at least one of input content, input quality, input speed, input time zone, and input term of the input device.

30. The data delivery management system according to claim 29, wherein said data delivery server system sends to the end-user terminal information generated based on the apportionment management information stored and managed in the apportionment management database, the information indicating that said data delivery server system wants to use an apportioned amount or apportionment level of the input capability apportioned and provided by the end-user terminal.

31. The data delivery management system according to claim 29, wherein the apportioned amount or apportionment level of the input capability apportioned and provided by the end-user terminal can be set by an end user on the end-user terminal.

32. The data delivery management system according to claim 29, wherein said terminal system management device records usage of the end-user terminal and automatically sets an appropriate apportioned amount or apportionment level of the input capability according to the recorded usage.

33. The data delivery management system according to claim 28, wherein a plurality of end-user terminals are connected to said data delivery server system over the network, and said data delivery server system selects at least one of the plurality of end-user terminals, based on the apportionment management information stored and managed in the apportionment management database, to send to the selected end-user terminal information indicating that said data delivery server system wants to use the display capability apportioned and provided by the end-user terminal.

34. The data delivery management system according to claim 28, wherein when the end-user terminal is connected to said data delivery server system over the network, the apportionment management information is automatically sent to said data delivery server system from the end-user terminal.

35. The data delivery management system according to claim 28, wherein information about usage charge for the input capability apportioned and provided by the end-user terminal is added to information about the input capability to produce apportionment management information, to allow an end user to set the usage charge on the end-user terminal, and when said data delivery server system sends to the end-user terminal information indicating that said data delivery server system pays the usage charge according to the apportionment management information including the information about the usage charge stored and managed in the apportionment management database, the end-user terminal makes available to the data delivery server system the input capability apportioned and provided by the end-user terminal.

36. The data delivery management system according to claim 28, wherein said data delivery server system sends the apportionment management information stored and managed in the apportionment management database, to a content supply system connected to said data delivery server system over the network, and, when said data delivery server system receives a request form the content supply server for usage the input capability apportioned and provided by the end-user terminal, said data delivery server system allows the content supply system to use the input capability apportioned and provided by the end-user terminal or terminals.

37. A data delivery management system, comprising:
an end-user terminal; and
a data delivery server, said data delivery server system delivers data to said end-user terminal over a network, and said end-user terminal comprises:
a terminal system management device for generating apportionment management information concerning a communication capability of a communication device included in said end-user terminal, the communication capability being apportioned and provided by said end-user terminal, and
said data delivery server system comprises:
an apportionment management database for storing and managing therein the apportionment management information concerning said end-user terminal,
a delivery system management server for controlling storage of the apportionment management information in said apportionment management database, and controlling, based on the apportionment management information stored and managed in said apportionment management database the delivery of data to said end-user terminal by said delivery server, so that the data is delivered according to the display capability apportioned and provided by said end-user terminal.

38. The data delivery management system according to claim 37, wherein said apportionment management information includes the apportioned amount or apportionment level of the communication capability, said apportionment level specifying grade-wise the apportioned amount of the communication capability, and the apportioned amount of the communication capability includes at least one of transfer rate, communication amount, communication time zone, and communication term of the communication device.

39. The data delivery management system according to claim 38, wherein said data delivery server system sends to the end-user terminal information generated based on the apportionment management information stored and managed in the apportionment management database, the information indicating that said data delivery server system wants to use an apportioned amount or apportionment level of the communication capability apportioned and provided by the end-user terminal.

40. The data delivery management system according to claim 38, wherein the apportioned amount or apportionment level of the communication capability apportioned and provided by the end-user terminal can be set by an end user on the end-user terminal.

41. The data delivery management system according to claim 38, wherein said terminal system management device records usage of the end-user terminal and automatically sets an appropriate apportioned amount or apportionment level of the communication capability according to the recorded usage.

42. The data delivery management system according to claim 37, wherein a plurality of end-user terminals are connected to said data delivery server system over the network, and said data delivery server system selects at least one of the plurality of end-user terminals, based on the apportionment management information stored and managed in the apportionment management database, to send to the selected end-user terminal information indicating that said delivery server system wants to use the communication capability apportioned and provided by the end-user terminal.

43. The data delivery management system according to claim 37, wherein when the end-user terminal is connected to said data delivery server system over the network, the apportionment management information is automatically sent to said data delivery server system from the end-user terminal.

44. The data delivery management system according to claim 37, wherein information about usage charge for the communication capability apportioned and provided by the end-user terminal is added to information about the communication capability to produce apportionment management information, to allow an end user to set the usage charge on the end-user terminal, and when said data delivery server system sends to the end-user terminal information indicating that said data delivery server system pays the usage charge according to the apportionment management information including the information about the usage charge stored and managed in the apportionment management database, the end-user terminal makes available to the data delivery server system the communication capability apportioned and provided by the end-user terminal.

45. The data delivery management system according to claim 37, wherein said data delivery server system sends the apportionment management information stored and managed in the apportionment management database to a content supply system connected to said data delivery server system over the network, and, when said data delivery server system receives a request from the content supply server for usage the communication capability apportioned and provided by the end-user terminal, said data delivery server system allows the content supply system to use the communication capability apportioned and provided by the end-user terminal or terminals.

* * * * *